(12) United States Patent
Miglani et al.

(10) Patent No.: US 8,030,235 B2
(45) Date of Patent: Oct. 4, 2011

(54) REFRACTORY BRICK FOR STEEL LADLES

(75) Inventors: Shyam Miglani, State College, PA (US); H. David Prior, Bethel Park, PA (US); David J. Michael, White Oak, PA (US)

(73) Assignee: North American Refractories Company, Moon Township, PA (US)

( * ) Notice: Subject to any disclaimer, the term of this patent is extended or adjusted under 35 U.S.C. 154(b) by 269 days.

(21) Appl. No.: 12/338,069

(22) Filed: Dec. 18, 2008

(65) Prior Publication Data

US 2010/0160142 A1 Jun. 24, 2010

(51) Int. Cl.
C04B 35/03 (2006.01)
C04B 35/42 (2006.01)

(52) U.S. Cl. .................................. 501/108; 501/118

(58) Field of Classification Search ............... 501/1, 94, 501/99, 100, 108, 118, 119, 136, 101, 109
See application file for complete search history.

(56) References Cited

U.S. PATENT DOCUMENTS

| | | | |
|---|---|---|---|
| 3,615,776 A * | 10/1971 | Farrington et al. | 501/110 |
| 4,431,745 A * | 2/1984 | Watanabe et al. | 501/101 |
| 4,497,901 A | 2/1985 | Ohtsuki et al. | 501/90 |
| 4,657,878 A * | 4/1987 | Clishem et al. | 501/115 |
| 4,830,992 A * | 5/1989 | Ichikawa et al. | 501/100 |
| 6,313,056 B1 * | 11/2001 | Li et al. | 501/101 |
| 6,461,991 B1 | 10/2002 | Ogata et al. | 501/99 |
| 6,763,981 B2 * | 7/2004 | Peretz et al. | 222/594 |
| 6,884,472 B2 | 4/2005 | Van Den Neste et al. | 427/453 |
| 2005/0053892 A1 * | 3/2005 | Shiromizu et al. | 432/251 |
| 2007/0203013 A1 * | 8/2007 | Harmuth | 501/133 |

FOREIGN PATENT DOCUMENTS

| | | | |
|---|---|---|---|
| JP | 56092106 A * | 7/1981 | |
| JP | 04-119962 | 4/1992 | |
| JP | 04-144958 | 5/1992 | |
| JP | 07-267719 | 10/1995 | |
| JP | 08-319153 | 12/1996 | |
| JP | 2006-111501 | 4/2006 | |

* cited by examiner

*Primary Examiner* — Jerry Lorengo
*Assistant Examiner* — Lynne Edmondson
(74) *Attorney, Agent, or Firm* — Kusner & Jaffe

(57) ABSTRACT

A magnesia-carbon brick comprised of about 50 to about 95% by weight magnesia and about 1 to about 20% by weight carbon, with or without metallic additions, such that the chemical analysis of the mixture of aggregates used in the brick will comprise, by chemical analysis, about 2 to about 15% $SiO_2$, about 3 to about 50% $Al_2O_3$, and about 50 to about 95% MgO.

7 Claims, No Drawings

REFRACTORY BRICK FOR STEEL LADLES

FIELD OF THE INVENTION

The present invention relates generally to refractory materials, and more particularly, to refractory materials for lining steel ladles.

BACKGROUND OF THE INVENTION

Steel ladles are used in the manufacture of steel. It is known to use different types of refractory materials in various areas of the ladles to achieve the most cost-effective lining. In this respect, different wear mechanisms exist in various areas within a steel ladle. Refractory materials that are appropriate for various areas have been developed.

For example, magnesia-carbon bricks are often used in slaglines of steel ladles. The term "slagline" refers to that area of the ladle sidewall that comes in contact with the slag layer that floats on top of the molten steel. On the other hand, either burned alumina bricks or alumina-magnesia-carbon bricks are often used in the "barrel" portion. The term "barrel" typically refers to the area of the ladle sidewall that is below the slagline. This is the area that is in contact with the molten steel when the ladle is filled to capacity. Magnesia-carbon bricks exhibit significantly better slag resistance than burned alumina bricks or alumina-magnesia-carbon bricks. Accordingly, magnesia-carbon bricks are well-suited for use in the slagline. Burned alumina bricks and alumina-magnesia-carbon bricks exhibit substantially poorer slag resistance than magnesia-carbon bricks, but have been heretofore considered the more cost-effective refractory selections for ladle barrels.

Alumina-magnesia-carbon bricks generally exhibit better erosion resistance, and are less subject to attack at the brick joints compared to burned alumina bricks. Brick "joints" refer to the areas where refractory bricks come into contact with each other after they are placed in the ladle lining. Thus, alumina-magnesia-carbon bricks are often used to line the barrel portions of steel ladles.

The decision of whether to use alumina-magnesia-carbon brick in steel ladle barrels is dictated by many factors. For instance, one factor to be considered in the selection of materials is the availability of raw materials. In this respect, about 65% to 90% of alumina-magnesia-carbon brick may be formed of bauxite. Calcined bauxite is made by taking an ore of aluminum composed largely of hydrous aluminum oxides, and heat-treating it to remove the hydrous phases and to increase the bulk specific gravity of the material.

Bauxite is basically a raw material bought and sold in a world market. In today's global economy, companies must compete worldwide for raw materials, such as bauxite. At the present time, a large proportion of refractory-grade bauxite comes from Asian countries, most notably, China. As with any commodity, demand and availability dictate the cost of bauxite. In addition, currency exchange rates and shipping costs can significantly affect the cost of bauxite to a refractory manufacturer.

Therefore, there is a desire to reduce cost fluctuation and provide refractory linings that are even more cost-effective and less susceptible to market fluctuation than those currently in use. Thus, fluctuations in global demand, shipping costs and currency rates can significantly affect the availability and cost of the raw materials needed to form refractory materials used to line steel ladles.

The present invention provides an improved refractory material for forming refractory linings for steel ladles, which refractory materials are more cost effective than refractory materials known heretofore.

SUMMARY OF THE INVENTION

In accordance with a preferred embodiment of the present invention, there is provided a refractory material for lining a ladle used in steel making. The refractory is comprised of about 45% to about 95% by weight magnesia (MgO), about 1% to about 20% by weight carbon and about 4% to about 45% by weight aluminous chamotte.

In accordance with another aspect of the present invention, there is provided a magnesia-carbon brick comprised of about 50 to about 95% by weight magnesia and about 1 to about 20% by weight carbon, with or without metallic additions, such that the chemical analysis of the mixture of aggregates used in the brick will comprise, by chemical analysis, about 2 to about 15% $SiO_2$, about 3 to about 50% $Al_2O_3$, and about 50 to about 95% MgO. The term "aggregates" as used herein refers to the oxide-based ceramic particles in the product, regardless of particle size; in other words the term "aggregates" will include coarse, intermediate-sized and fine oxide-based ceramic particles.

An advantage of the present invention is an improved refractory material for use in steel ladles.

Another advantage of the present invention is an improved magnesia-carbon material for use in barrel portions of steel ladles.

Another advantage of the present invention is a refractory material as described above that includes non-basic aggregates.

Another advantage of the present invention is a refractory material as described above that is more cost-effective than refractory material currently in use.

A still further advantage of the present invention is a refractory material as described above that includes an aluminous chamotte.

These and other advantages will become apparent from the following description of a preferred embodiment.

DETAILED DESCRIPTION OF PREFERRED EMBODIMENT

The present invention relates to a refractory composition for forming refractory bricks for use in the barrel portion of a steel ladle. More specifically, the present invention relates to a magnesia-carbon brick that includes non-basic refractory aggregates.

As indicated above, magnesia-carbon bricks are typically used along the slagline portion of the ladle rather than along the barrel portion of the ladle. Magnesia-carbon bricks are comprised primarily of sintered magnesia, fused magnesia or combinations of those materials. The term "basic refractory aggregates" refers to those aggregates in which the majority of the aggregate is based upon magnesia (MgO), lime (CaO) or a combination of these oxides. According to the present invention, non-basic refractory aggregates are added to a magnesia-carbon refractory material to form a new class of refractory material that finds advantageous use in the barrel portion of a steel ladle.

As used herein, the term "non-basic refractory aggregate" refers generally to materials that are high in silica, alumina, titania, iron oxide and other similar constituents. These "non-basic refractory aggregates" have heretofore been considered to be undesirable for use in forming a magnesia-carbon brick.

As noted above, refractory bricks used to line the barrel portion of a steel ladle were heretofore typically comprised of burned alumina bricks or alumina-magnesia-carbon bricks. Both types of bricks have relatively large amounts of alumina therein, typically more than 45% by weight. On the other hand, magnesia-carbon bricks, the bricks used to line the slagline portion of the ladle, contain relatively little alumina, i.e., typically 2% or less by weight alumina.

The present invention provides a refractory material suitable for forming bricks for use in the barrel portion of a ladle, which refractory material is based upon a magnesia-carbon composition that includes alumina, but at levels significantly less than that of a conventional alumina-magnesia-carbon brick.

In accordance with the present invention there is provided a refractory composition for lining a ladle used in a steelmaking industry. The refractory material is comprised of:

about 45% to about 95% by weight magnesia (MgO);
about 1% to about 20% by weight carbon; and
about 4% to about 30% by weight of a non-basic aluminous refractory material.

In one embodiment of the present invention, the non-basic aluminous refractory material is an aluminous chamotte that includes:

silica ($SiO_2$) in an amount up to about 52% by weight;
alumina ($Al_2O_3$) in an amount up to about 70% by weight; and
titania ($TiO_2$) in an amount up to about 5% by weight.

It is contemplated that in place of aluminous chamotte, other non-basic aluminous refractory aggregates, such as alumina, silica, calcined clays, calcined bauxite, calcined mullite, fused mullite and olivine may find advantageous application together with a magnesia-carbon refractory to form a new class of refractory material according to the present invention. A typical olivine may have 43% $SiO_2$, 49% MgO and 7% $Fe_2O_3$.

The present invention shows that certain non-basic aluminous aggregates and materials, such as aluminous chamotte and olivine, can be added to conventional magnesia-carbon brick to create compositions that offer an opportunity for ladle linings that are even more cost-effective than those currently in use. Additional aggregates that can be added either alone or in combination to magnesia-carbon brick that would fall within the scope of this invention include calcined or fused bauxite, quartz, fused quartz, calcined clay, crude clay, tabular alumina, white fused alumina, calcined alumina, andalusite and others. The defining characteristic of the new class of refractories described herein is that the chemical analysis of the mixture of magnesia and the other aggregates will comprise 2-15% $SiO_2$, 3-50% $Al_2O_3$ and 50-95% MgO.

The present invention shall now be further described with respect to the following EXAMPLES.

TABLE I

Mix Compositions

| | Mix Designation: | | | | |
|---|---|---|---|---|---|
| | 1 | 2 | 3 | 4 | 5 |
| | Mix Description: | | | | |
| | Magnesia-Carbon Brick | Magnesia-Carbon Brick with 10% Aluminous Chamotte | Magnesia-Carbon Brick with 20% Aluminous Chamotte | Magnesia-Carbon Brick with 30% Aluminous Chamotte | Alumina-Magnesia-Carbon Brick |
| Deadburned 98% MgO Content Magnesia | 93% | 83% | 73% | 63% | |
| Aluminous Chamotte #4- 4 + 8 mesh | — | 5 | 10 | 15 | — |
| Aluminous Chamotte #4- 8 + 20 mesh | — | 5 | 10 | 15 | — |
| Bauxite, Grade 1 | | | | | 59.5% |
| Bauxite, Grade 2 | | | | | 24 |
| Deadburned Magnesite (95% MgO Grade), −6 mesh | — | — | — | — | 8 |
| Flake Graphite | 6 | 6 | 6 | 6 | 3 |
| Aluminum metal | 0.75 | 0.75 | 0.75 | 0.75 | 3.5 |
| Silicon Metal Powder | 0.25 | 0.25 | 0.25 | 0.25 | |
| Carbon Black | — | — | — | — | 2 |
| Plus Additions: | | | | | |
| Liquid Resole Resin | 3 | 3 | 3 | 3 | 3.4 |
| Density at the Press, pcf (Av 3): | 184.9 | 181.3 | 177.0 | 173.3 | 189.7 |
| Baking Temperature, °F.: | 350 | 350 | 350 | 350 | 350 |

TABLE I shows several refractory mixes. Mix Designation No. 1 is a conventional magnesia-carbon composition. Mix Designation No. 5 is a conventional alumina-magnesia-carbon composition. Mix Designation Nos. 2, 3 and 4 are basically magnesia-carbon compositions wherein the magnesia content of the mix has been reduced and been replaced by adding a calcined aluminous chamotte to a magnesia-carbon brick. Typical chemistries of various aluminous chamottes are given in TABLE II. Material #4 from TABLE II was the aluminous chamotte used in Mixes 2, 3 and 4 of TABLE I.

TABLE II

Chemical Analyses of Various Aluminous Chamottes

| | Material Designation: | | | | |
|---|---|---|---|---|---|
| | 1 | 2 | 3 | 4 | 5 |
| Silica ($SiO_2$) | 51.5% | 48 | 50 | 37.8% | 26.8% |
| Alumina ($Al_2O_3$) | 45.6 | 48.8 | 46.8 | 58.6 | 68.8 |

TABLE II-continued

Chemical Analyses of Various Aluminous Chamottes

| | Material Designation: | | | | |
|---|---|---|---|---|---|
| | 1 | 2 | 3 | 4 | 5 |
| Titania (TiO$_2$) | 1.70 | 1.89 | 1.89 | 2.21 | 2.82 |
| Iron Oxide (Fe$_2$O$_3$) | 0.90 | 0.95 | 0.95 | 1.13 | 1.22 |
| Lime (CaO) | 0.03 | 0.04 | 0.04 | 0.06 | 0.06 |
| Magnesia (MgO) | 0.07 | 0.08 | 0.08 | 0.07 | 0.08 |
| Soda (Na$_2$O) | 0.08 | 0.09 | 0.09 | 0.07 | 0.07 |
| Potash (K$_2$O) | 0.12 | 0.09 | 0.09 | 0.04 | 0.05 |
| Phosphorous Pentoxide (P$_2$O$_5$) | — | 0.09 | 0.09 | 0.1 | 0.11 |
| Total | 100.0% | 100.03% | 100.03% | 100.08% | 100.01% |

In the past, adding an aluminous chamotte to a magnesia-carbon brick would have been considered to be undesirable. Mixes 2, 3 and 4 of TABLE I contain 10, 20 and 30% of the aluminous chamotte, respectively.

The physical properties of the respective mixes are shown in TABLE III.

TABLE III

Physical Properties (After Baking)

| | Mix Designation: | | | | |
|---|---|---|---|---|---|
| | 1 | 2 | 3 | 4 | 5 |
| | Mix Description: | | | | |
| | Magnesia-Carbon Brick | Magnesia-Carbon Brick with 10% Aluminous Chamotte | Magnesia-Carbon Brick with 20% Aluminous Chamotte | Magnesia-Carbon Brick with 30% Aluminous Chamotte | Alumina-Magnesia-Carbon Brick |
| Bulk Density, pcf: | 180.7 | 176.7 | 172.6 | 168.4 | 185.3 |
| Apparent Porosity, %: | 11.7 | 12.2 | 12.8 | 13.6 | 14.5 |
| Apparent Specific Gravity: | 3.28 | 3.23 | 3.17 | 3.12 | 3.47 |
| Linear Change After a 2000° F. reheat (oxidizing) (Av 3) | | | | | |
| Cycle #1: | +0.2 | 0.2 | +0.4 | +0.3 | +0.5 |
| Cycle #2: | 0.1 | +0.2 | +0.5 | +0.5 | +0.8 |
| Cycle #3: | +0.1 | +0.4 | +0.5 | +0.5 | +0.8 |
| Cycle #4 | +0.1 | +0.3 | +0.5 | +0.5 | +0.8 |
| Modulus of Rupture, psi (Av 3) | | | | | |
| At Room Temperature: | 2690 | 2520 | 2210 | 2000 | 3710 |
| At 2550° F. (Quick Insertion): | 719 | 449 | 353 | 194 | 575 |
| Oxidation of 2" Cube, mm of oxidation (Av 3) | | | | | |
| At 2000° F.: | 12.1 | 12.8 | 12.0 | 10.7 | 10.9 |
| At 2700° F.: | 15.9 | 15.8 | 14.9 | 16.1 | 14.3 |
| Induction Furnace Slag Test Using Aluminum-Killed Slag (360 minute run), Erosion Rate mm$^2$/hr (Av 2): | 32.7 | 75.5 | 116 | 154 | 162 |
| Comment: | | | | | The slag eroded completely through the test brick into the |

TABLE III-continued

Physical Properties (After Baking)

| | Mix Designation: | | | | |
|---|---|---|---|---|---|
| | 1 | 2 | 3 | 4 | 5 |
| | Mix Description: | | | | |
| | Magnesia-Carbon Brick | Magnesia-Carbon Brick with 10% Aluminous Chamotte | Magnesia-Carbon Brick with 20% Aluminous Chamotte | Magnesia-Carbon Brick with 30% Aluminous Chamotte | Alumina-Magnesia-Carbon Brick |
| Induction Furnace Slag Test Using Silicon-Killed Slag (360 minute run), Erosion Rate mm$^2$/hr (Av 2): | 61.5 | 107 | 167 | backup lining of the induction furnace. 252 | 239 |
| Comment: | | | | The slag eroded completely through the test brick into the backup lining of the induction furnace. | The slag eroded completely through the test brick into the backup lining of the induction furnace. |

The chemical analysis of the respective mixes on a calcined basis is shown in TABLE IV.

TABLE IV

Chemical Analysis (Calcined Basis)

| | Mix Designation: | | | | |
|---|---|---|---|---|---|
| | 1 | 2 | 3 | 4 | 5 |
| | Mix Description: | | | | |
| | Magnesia-Carbon Brick | Magnesia-Carbon Brick with 10% Aluminous Chamotte | Magnesia-Carbon Brick with 20% Aluminous Chamotte | Magnesia-Carbon Brick with 30% Aluminous Chamotte | Alumina-Magnesia-Carbon Brick |
| Silica (SiO$_2$) | 1.05% | 4.69% | 8.48% | 11.33% | 4.34% |
| Alumina (Al$_2$O$_3$) | 1.39 | 7.53 | 13.88 | 19.18 | 81.78 |
| Titania (TiO$_2$) | 0.01 | 0.28 | 0.56 | 0.80 | 3.12 |
| Iron Oxide (Fe$_2$O$_3$) | 0.29 | 0.35 | 0.46 | 0.56 | 1.52 |
| Chromic Oxide (Cr$_2$O$_3$) | 0 | 0 | 0 | 0.03 | 0.05 |
| Zirconia (ZrO$_2$) | 0.02 | 0.03 | 0.04 | 0.03 | 0.14 |
| Lime (CaO) | 1.01 | 0.91 | 0.80 | 0.73 | 0.25 |
| Magnesia (MgO) | 96.35 | 86.30 | 75.85 | 67.36 | 8.49 |
| Manganese Oxide (MnO) | 0.02 | 0.02 | 0.01 | 0.01 | 0.00 |
| Soda (Na$_2$O) | 0 | 0 | 0 | 0 | 0 |
| Potash (K$_2$O) | 0 | 0.01 | 0.02 | 0.03 | 0.18 |
| Phosphorous Pentoxide (P$_2$O$_5$) | 0.00 | 0.01 | 0.02 | 0.02 | 0.14 |
| Total (As-Received Basis) | 100.14% | 100.13% | 100.12% | 100.08% | 100.01% |
| Total Carbon | 6.96 | 6.86 | 6.91 | 6.99 | 6.55 |

TABLE V illustrates the level of oxides that would be contributed to a magnesia-carbon brick with additions of 10%, 20% and 30% of the aluminous chamotte #4 added thereto.

TABLE V

| Chemical Analysis (Calcined Basis) | 10% Aluminous Chamotte Addition | 20% Aluminous Chamotte Addition | 30% Aluminous Chamotte Addition |
|---|---|---|---|
| Silica ($SiO_2$) | 3.78% | 7.56% | 11.34% |
| Alumina ($Al_2O_3$) | 5.86 | 11.72 | 17.58 |
| Titania ($TiO_2$) | 0.22 | 0.44 | 0.66 |
| Iron Oxide ($Fe_2O_3$) | 0.11 | 0.23 | 0.34 |
| Lime (CaO) | 0.01 | 0.01 | 0.02 |
| Magnesia (MgO) | 0.01 | 0.01 | 0.02 |
| Soda ($Na_2O$) | 0.01 | 0.01 | 0.02 |
| Potash ($K_2O$) | 0.00 | 0.01 | 0.01 |
| Phosphorous Pentoxide ($P_2O_5$) | 0.01 | 0.02 | 0.03 |
| Total | 10.01 | 20.01% | 30.02% |

Two slag tests were run on the brick compositions given in TABLE I. These tests were run in an induction furnace in which a layer of slag was placed on top of a liquid steel bath. The sidewalls of the induction furnace were constructed with the test brick. One slag test used an aluminum-killed ladle slag while the other contained a silicon-killed ladle slag. The data show that the addition of the aluminous chamotte to the magnesia-carbon brick composition caused the slag resistance to deteriorate. However, with additions of 10% and 20% of the aluminous chamotte to the magnesia-carbon brick, the slag resistance was superior to that of the alumina-magnesia-carbon brick that is the standard ladle barrel brick. (See TABLE III). Even with a 30% addition of aluminous chamotte, the slag resistance of the magnesia-carbon brick was comparable to that of the alumina-magnesia-carbon brick.

These data illustrate that it is feasible to add up to 30% of an aluminous non-basic refractory material to a magnesia-carbon brick to create a new class of ladle barrel brick. The data confirm that the properties critical to performance in ladle barrels are adequate with this new class of brick. Based on the data in TABLES III and V, it is feasible to add an aggregate to the magnesia-carbon brick that contributes up to approximately 11.5% $SiO_2$, 18% $Al_2O_3$, and 0.66% $TiO_2$ as well as other oxides. The $SiO_2$, $Al_2O_3$ and $TiO_2$ at the levels indicated would be considered to be the principal foreign oxides in a magnesia-carbon composition.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A refractory material for lining a ladle used in steel making, said refractory comprised of:
    about 45% to about 95% by weight of a basic refractory aggregate comprised primarily of magnesia (MgO);
    about 1% to about 20% by weight carbon; and
    about 4% to about 45% by weight of an aluminous refractory aggregate, comprised of:
       about 25% to about 55% by weight silica ($SiO_2$);
       about 40% to about 70% alumina ($Al_2O_3$); and
       about 1.5% to about 3.0% titania ($TiO_2$).

2. A refractory material as defined in claim 1, wherein said aluminous refractory aggregate is aluminous chamotte.

3. A refractory material as defined in claim 1, wherein said aluminous refractory aggregate has a particle size ranging from −4 Tyler mesh to +20 Tyler mesh.

4. A refractory material as defined in claim 1, wherein about 50% of said aluminous refractory aggregate has a particle size ranging from −4 Tyler mesh to +8 Tyler mesh.

5. A refractory material as defined in claim 1, wherein about 50% of said aluminous refractory aggregate has a particle size ranging from −8 Tyler mesh to +20 Tyler mesh.

6. A refractory material as defined in claim 1, further comprising about 1% to about 20% by weight graphite.

7. A refractory material as defined in claim 1, wherein said magnesia has a particle size less than 6 Tyler mesh.

* * * * *